United States Patent [19]

Nagao et al.

[11] Patent Number: 5,424,947
[45] Date of Patent: Jun. 13, 1995

[54] NATURAL LANGUAGE ANALYZING APPARATUS AND METHOD, AND CONSTRUCTION OF A KNOWLEDGE BASE FOR NATURAL LANGUAGE ANALYSIS

[75] Inventors: Katashi Nagao; Hiroshi Nomiyama, both of Kawasaki, Japan

[73] Assignee: International Business Machines Corporation, Armonk, N.Y.

[21] Appl. No.: 714,408

[22] Filed: Jun. 12, 1991

[30] Foreign Application Priority Data

Jun. 15, 1990 [JP] Japan .................................. 2-155570

[51] Int. Cl.⁶ ............................................ G06F 15/38
[52] U.S. Cl. .................................................. 364/419.08
[58] Field of Search ................ 364/419, 419.08, 419.04

[56] References Cited

U.S. PATENT DOCUMENTS

| | | | |
|---|---|---|---|
| 4,994,967 | 2/1991 | Asakawa | 364/419 |
| 5,060,155 | 10/1991 | Van Zuijlen | 364/419 |
| 5,109,509 | 4/1992 | Katayama et al. | 364/419 |
| 5,128,865 | 7/1992 | Sandler | 364/419 |
| 5,181,163 | 1/1993 | Nakajima et al. | 364/419 |

*Primary Examiner*—Robert A. Weinhardt
*Assistant Examiner*—Xuong M. Chang-Trans

*Attorney, Agent, or Firm*—James E. Murray; Ronald L. Drumheller

[57] ABSTRACT

A system for resolving structural ambiguities in syntactic analysis of natural language, which ambiguities are caused by prepositional phrase attachment, relative clause attachment, and other modifier-modifiee relationships in sentences. The system uses instances of dependency (modification relationship) structures extracted from a terminology dictionary as a knowledge base. Structural ambiguity is represented by indicating that a word in a sentence has several words as candidate modifiees. The system resolves such ambiguity by 1) first searching the knowledge base, which contains dependency information in the form of tree structures, for dependencies between the word and each of its possible modifiees, 2) then assigning an order of preference to these dependencies by means of a path search in the tree structures, and 3) finally selecting the most preferable dependency as the modifiee. The sentences can be analyzed by a parser and transformed into dependency structures by the system. The knowledge base can be constructed automatically, since the source of knowledge exists in the form of texts, and knowledge bootstrapping can be realized by adding the outputs of the system to its knowledge base.

31 Claims, 6 Drawing Sheets

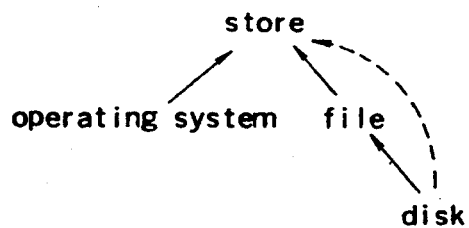
FIG. 6
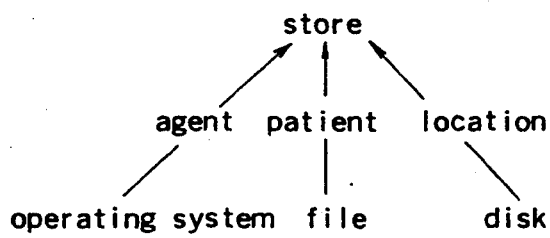
FIG. 7
"CMS is an operating system."
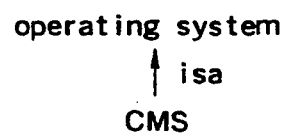
FIG. 8
"Authorized program is a synonym for privileged program."
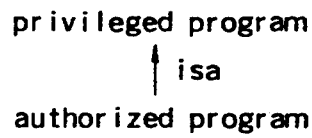      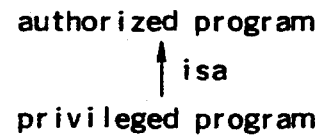
FIG. 9
SYNONYM
keep ⟶ store
        ↑ DEPENDENCY
   disk ⟵ virtual disk
HYPERNYM
FIG. 10 on
keep→virtual disk isa
keep→store
   ↑ location
   disk→virtual disk
        isa subject    on
VM/SP ——→ keep→virtual disk agent         location
operating system ——→ store ——— disk isa
VM/SP→operating system

NATURAL LANGUAGE ANALYZING APPARATUS AND METHOD, AND CONSTRUCTION OF A KNOWLEDGE BASE FOR NATURAL LANGUAGE ANALYSIS

BACKGROUND OF THE INVENTION

1. Field of the Invention

This invention relates to natural language processing systems and more particularly to an apparatus and method for resolving structural ambiguities in sentences, using knowledge of the dependencies among words in sentences of natural language, and further to a method for constructing a knowledge base used in this connection. The term "words" herein signifies parts of speech such as nouns, verbs, adjectives, adverbs, and other semantic words, but excludes articles, repositions, and other functional words. A semantic unit of successive words is also regarded as one word in some fields. For example, in documents related to computer technology the expression "virtual disk" is regarded as one word. The term "dependency" indicates a modifier-modifiee relationship among words.

2. Prior Art

Resolution of structural ambiguities in sentences still remains a difficult problem for natural language processing systems. An example of tile problem is offered by prepositional phrase attachment ambiguities. The sentence, "A user can log on the system with a password.", is ambiguous as to whether the prepositional phrase "with a password" is attached adverbially to the verb "log on" or as a postmodifier to the noun phrase "the system."

Some methods have been proposed for resolving structural ambiguities in sentences based on semantic and functional information on words, phrases, and other constituent elements. One such method is theoretically based on the case grammar disclosed in the article entitled, "Toward a modern theory of case" by Chares J. Fillmore on pp. 361-375 of "Modern Studies in English", published in 1969 by Prentice-Hall. The functions of the constituent elements of a sentence for a predicate are called cases, and semantic case functions are specifically called semantic cases (see appended Table 1).

In case grammar, each constituent element of a sentence is called a case element, and the adequacy of a sentence is evaluated by matching the cases and the case elements. Taking the above-indicated sentence as an example, the term "log on" is a predicate, while "a user" functions as an agent, "the system" as an object, and "a password" as an instrument. Each verb is assigned to a framework called a case frame in which the case of each verb and the constraint conditions of case elements with respect to the verb are described.

In case grammar, acceptable case elements for a case are defined, and any input outside the definition is rejected as being semantically inadequate. In practical language usage, however, the boundary between semantically acceptable and non-acceptable sentences is a delicate one, and this also depends on the content. For example, in the sentence, "My car drinks gasoline.", if the predicate "drink" merely accepts a word indicative of a human (a word having the semantic attribute HUM) as its agent, the term "car" is rejected as the agent of "drink." However, if "the car" is considered to be used metaphorically, the term "car" is semantically accepted as an agent of the term "drink". In a system such as case grammar that uses attribute values, it is easy to construct knowledge, but its application lacks flexibility.

Japanese Published Unexamined Patent Application 63-91776 discloses a method using statistical information on the frequency of words to calculate the degree of preference of syntactic analysis trees for solving structural ambiguities. A summary of the method is given below, and some problems with it are explained.

(1) Multiple analysis trees are actually produced from an incoming sentence, and an acceptable one is selected from among them. It is troublesome to make multiple parse trees.

Furthermore, it is necessary to use information even on words that are closely related to the ambiguities.

(2) The statistical frequency of co-occurrence relationships between words is used to solve ambiguities. Therefore, individual exceptions cannot be dealt with. For example, when an ambiguity exists as to whether a certain word A modifies word. B or word C, the method does not consider that although it is statistically usual for A to modify B, in a certain particular sentence it modifies C. Further, since this method requires sufficiently formalized data (for example, registration of "virtual machine" as "machine is virtual"), collecting data is very costly.

(3) In general, the number of words in natural languages is enormous. In this connection, a category called the semantic marker, which is obtained by abstracting words, is established in order to extend the coverage range. However, it must be rearranged for a different field. For example, the term "department" is classified into the category of organization in a certain field P, and knowledge on the attachments of "department" is absorbed into statistical information on co-occurrence relationships between the organization category and another category. However, when the term "department" is classified into another category in a different field Q, the knowledge in field P is useless in field Q. It is very costly to re-abstract words and re-collect statistical information for each field.

Problems to be Solved by the Invention

As will be seen from the above description, practical semantic processing in natural language processing involves two problems. One is efficient construction of the requisite large-scale knowledge base. The other is a mechanism for efficient use of that knowledge base.

An object of the invention is to provide a natural language semantic analysis system that overcomes these two problems and is acceptable for practical use,

SUMMARY OF THE INVENTION

Structural ambiguity, which is the greatest bottleneck in the analysis of natural language sentences, is caused by the presence of multiple modifier-modifiee relationships (dependencies) among words. Such structural ambiguity cannot be solved by grammatical knowledge alone, but requires semantic processing. From this viewpoint, the invention overcomes the problem by preliminarily defining dependencies among words as background knowledge and referring to this background knowledge, stored in a knowledge base, in order to select an adequate dependency among candidate dependencies. More specifically, when the system obtains a structure, including multiple attachment candidates, as a result of syntactic analysis of a sentence, it then obtains the degree of preference of dependencies among words in the sentence, based on the dependencies among the words stored as the background knowledge, and can determine which attachment is preferable.

With the system of the present invention, in order to solve the problem of structural ambiguity, a knowledge base is first created and knowledge, expressed in the form of tree structures indicative of synonym relationships, taxonym relationships, and dependencies among words, is stored as background knowledge in the knowledge database. Then, when a sentence is entered into the system and syntactically analyzed, the system searches for dependencies among words defined by the background knowledge, using synonym relationships and taxonym relationships. Subsequently, using a consistency condition obtained from the sentence and one obtained from the context, the system selects, by means of a path search, the most acceptable attachment and solves the ambiguity. The select call attachment or syntactic tree is output for use and the dependency structure decided upon is registered in the knowledge base as context dependency data.

Therefore, a natural language analysis apparatus according to the invention can be used for sentence analysis in machine translation systems, question-and-answer systems using natural languages, and so on, to output the most preferable syntactic tree, in response to an incoming sentence that includes structural ambiguities, by using knowledge on synonym relationships, taxonym relationships, and dependencies among words. Consequently, the system can be used to solve problems that are insoluble by granular-based analysis, such as ambiguities that can only be solved by the use of expert knowledge proper to a specific field or by referring to the contents of a preceding sentence.

A common characteristic of conventional analysis methods is that information the words should preliminarily have associated therewith, such as attributes for semantic classification, is very abundant and this information is heuristically determined by human beings. In contrast, information required for natural language analysis according to the invention is described relatively formally, and large-scale new background knowledge can be constructed automatically or semi-automatically during the analyzing process, thus making it relatively easy to construct a practical system.

BRIEF DESCRIPTION OF THE DRAWINGS

FIG. 6 is an explanatory diagram of an example of dependency structure;

FIG. 7 is an explanatory diagram of dependencies and semantic cases;

FIG. 8 is an explanatory diagram of a taxonym relationship;

FIG. 9 is an explanatory diagram of a synonym relationship;

FIG. 10 is an explanatory diagram of a path;

FIG. 11 is an explanatory diagram of the node location of a word on a dependency structure tree;

FIG. 12 is an explanatory diagram of an "isa" tree;

FIG. 13 is an explanatory diagram of a transition of a dependency;

FIG. 14 is an explanatory diagram of a path from word c to word a;

DETAILED DESCRIPTION OF THE PREFERRED EMBODIMENT

Figure 1:
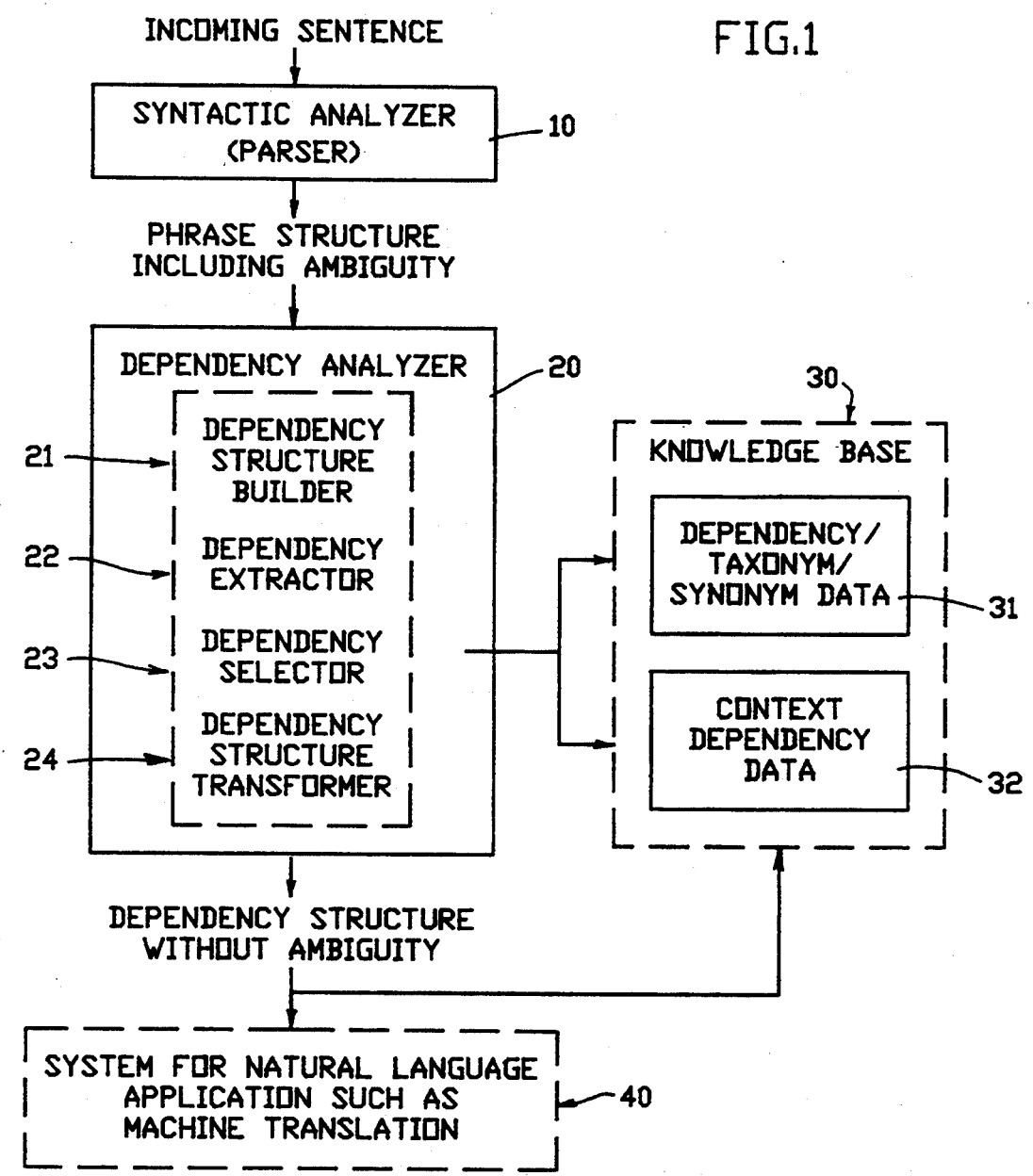
FIG. 1 is an illustrative diagram of an arrangement of a natural language analyzing system according to the invention.

A block diagram of a system in accordance with the present invention is shown in FIG. 1, which diagram will be used to explain the constituent elements of the system. The example given is in English; however, the system is not limited to use with any specific language.

Syntactic Analyzer

Figure 2:
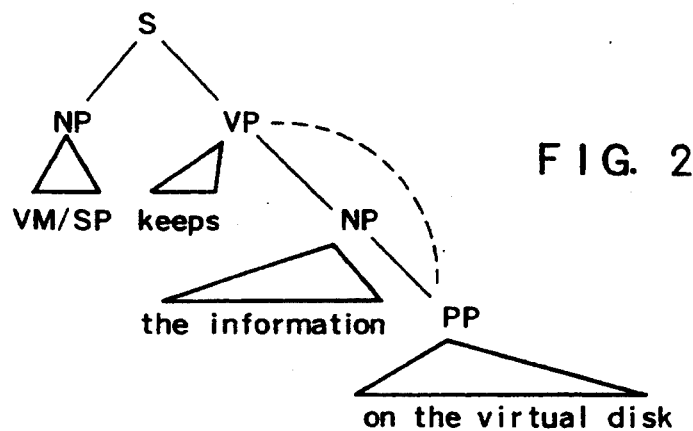
FIG. 2 is an explanatory diagram of a phrase structure including ambiguities.

To begin with, a syntactic analyzer 10 or passer receives a sentence and outputs a syntactic structure involving ambiguities. The sentence, four example, "VM/SP keeps the information on the virtual disk", is syntactically analyzed into a phrase structure involving attachment ambiguities, as shown in FIG. 2. Syntactic analysis technology is known in the art and is not involved as such in the present invention, so that a detailed description of the internal operation of the analyzer will not be presented here. It will be understood that the invention is essentially directed to dealing with the output of such devices.

Dependency Analyzer

The syntactic structure output is received by a dependency analyzer 20 which analyzes dependency structure and contains:

(1) a dependency structure builder 21;
(2) a dependency extractor 22;
(3) a dependency selector 23; and
(4) a dependency structure transformer 24.

Figure 3:
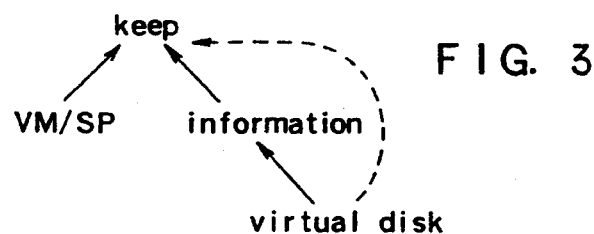
FIG. 3 is an explanatory diagram of a dependency structure including ambiguities.

In the dependency structure builder 21 a phrase structure is converted into a dependency structure explicitly indicating dependencies between words, as shown in FIG. 3. The phrase structure attachment ambiguities are expressed as ambiguities in dependencies among words. The dependencies are provided with labels corresponding to semantic cases. These labels are determined by referring to the grammatical word sequence and prepositions, and are expressed as a candidate list of possible semantic cases.

Figure 4:
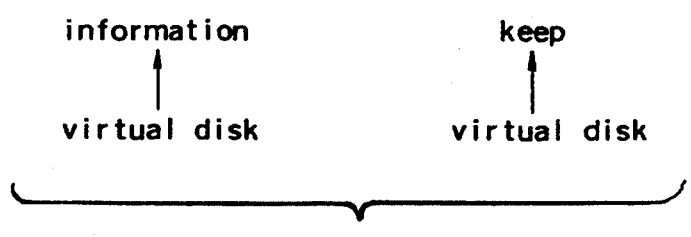
FIG. 4 is an explanatory diagram of possible dependency candidates.

Ambiguous dependencies are extracted by the dependency extractor 22 from the created dependency structure as shown in FIG. 4. They are expressed as multiple possible candidate dependencies for one ambiguity.

In the dependency selector 23, relationships corresponding to the possible candidate dependencies are searched for in a background knowledge database 30, which contains knowledge expressed in the form of tree structures indicative of synonym relationships, taxonym relationships, and dependencies among words. When relationships are found for two or more candidates, the most preferable relationship is determined by using constraint conditions as will be explained below.

The dependency structure transformer 24 takes the most likely dependency for each ambiguity selected and accordingly transforms the dependency structure to resolve the structural ambiguity. In this case, the semantic case attached to the dependency is also determined uniquely. Thus, the output of the dependency analyzer 20 is the dependency structure of a sentence in which every ambiguity has been resolved. This output may then be provided to a utilization device 40 such as a system for natural language application, e.g., a machine translation. Further, knowledge bootstrapping may be accomplished by adding this output to the knowledge base 30.

Knowledge Base

As the determined dependency may be used as a constraint for analysis of subsequent sentences, it is therefore registered in the knowledge base 30 as context dependency data. Two features or characteristics of the system of the invention are a semi-automatically built knowledge base and a mechanism for selecting the best dependency by using the knowledge base. These will now be explained.

Construction of a Knowledge Base

The knowledge base 30 is initially constructed from collected information concerning words, such as terminology commentary. The system of the invention extracts semantic relationships between a certain word and another word, namely, synonym relationships, taxonym relationships, and dependencies. These relationships form a portion 31 of the knowledge base 30. The system expresses an item of knowledge in the form of a tree structure, for the reasons that:

(1) the tree structure can be made semi-automatically by analyzing a sentence; and (2) it is suitable for expressing taxonym relationships and dependencies. (A synonym relationship may be converted into two taxonym relationships, as will be explained later.)

A further reason is that:

(3) inference for dependency structure analysis is basically a process of traversing up a branch of a tree structure. The knowledge base 30 contains tree structures indicative of dependency structures obtained from sentence and taxonym relationships obtained by converting the dependency structures. In other words, base 30 is a group of tree structures.

In conventional natural language processing systems, in which the necessary information for sentence analysis is not formalized, frames or other means capable of expressing substantially anything have been used successfully. However, such frame expressions are difficult to construct systematically, and largely rely upon human effort. Therefore, increasing the scale of the knowledge base is very laborious.

The knowledge base 30 of the present system can be built in a bottom-up manner; this makes it easy to increase the scale, and also corresponds to the nature of the problem of structural ambiguities. Naturally, knowledge must be acquired beforehand by learning (learned data). The data in the knowledge base are generated by analyzing commentaries on words, creating dependency structures, and then converting them. The preferred process will now be described.

Figure 5:
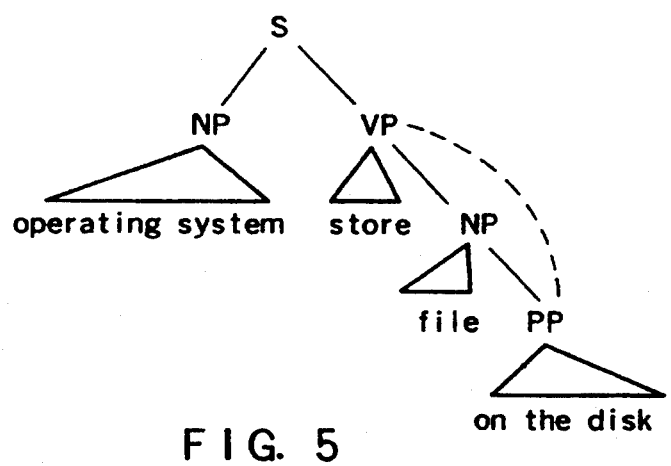
FIG. 5 is an explanatory diagram of an example of phrase structure.
Figure 1:
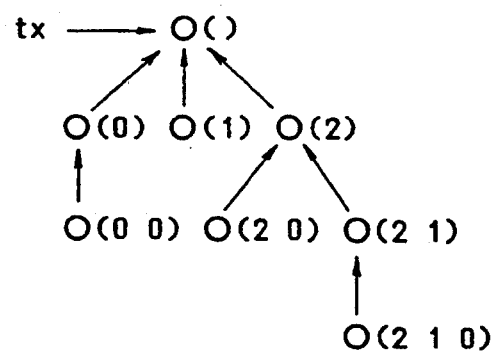
Figure 1:
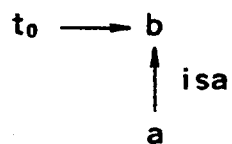
Figure 1:
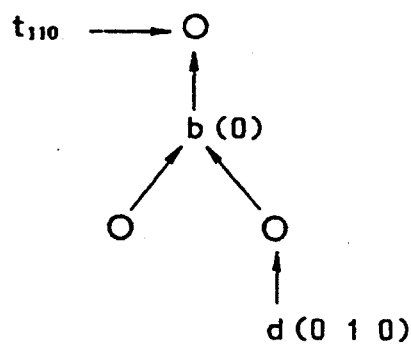
Figure 1:
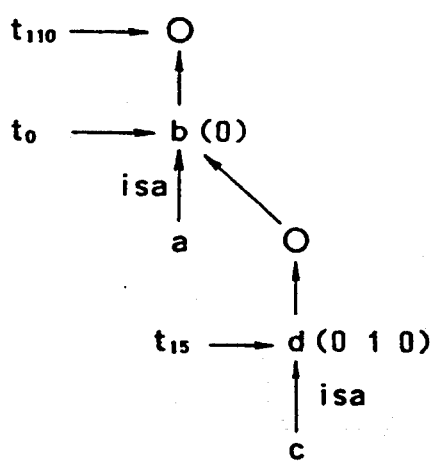

(1) The syntactic analyzer 10 creates phase structures from an incoming sentence, and provides them to dependency analyzer 20 which converts them into dependency structures that define attachment relationships among words. In the learning step, a person determines ambiguous attachment relationships, and specifies a structure. For example, from the sentence, "Operating system stores files on the disk", the phrase structure shown in FIG. 5 is created. It is then input to the dependency analyzer 20 where it is converted into the dependency structure with ambiguity shown in FIG. 6. This conversion is done by the dependency structure builder 21 of the dependency structure analyzer 20.

(2) As shown in FIG. 7, semantic case labels (agent, patient, location) are attached as attributes to the links indicating dependencies among words. Attachment of the labels behaves as a constraint condition for use in disambiguation. These labels are unambiguously determined by a person in the learning step after their candidates have been attached by the dependency structure builder 21.

(3) The dependency structure, resulting from sentences containing a taxonym (hypernym/hyponym) relationship and a synonym relationship between words such as "A is a B", "A is a synonym for B", and so on, is converted into a structure in which A and B are connected by a link labeled with "isa". This structure is called an "isa tree", and examples are shown in FIGS. 8 and 9. These dependencies will be stored in portion 31 of knowledge base 30.

Selection of the Most Preferable Dependency

In order to select the most preferable dependency, the system employs an improved method involving (1) searching paths corresponding to respective dependencies (path search) in the knowledge base 30, and (2) calculating values, called "dependency distances" for respective paths, on the basis of constraint conditions (distance calculation). The system then selects the dependency corresponding to the path having the shortest dependency distance as the most preferable dependency. This is done by the dependency selector 23 of the dependency structure analyzer 20.

The path search first limits the search space in the enormous amount of knowledge by using co-occurrence between words. The probability of occurrence of a single word in a natural language is very small, and thus very little knowledge is needed for two words actually co-occurring. As a result, those words subject to distance calculation, which create the heaviest calculating load, are very few. This results in a very efficient search. The path search and the distance calculation in accordance with the invention will now be described.

Path Search

A path between two words incorporates chains of synonyms and hypernyms starting from them and at least one dependency between the words at the ends of the chains. In other words, a path is a route between words if a knowledge base is regarded as a graph with words at its nodes. For example, a graph of the path between the words "keep" and "virtual disk" is shown in FIG. 10. The following algorithm has been developed in order to search for paths in a knowledge base. It uses an index table, such as shown in appended Table 2. In that table, the symbol tx denotes a pointer of a tree in which the word in the left-hand column appears, and values in parentheses indicate the node location of the word in the tree (see FIG. 11). The values shown are selected randomly by way of example and the center and right-hand columns of the Table represent the "isa" relationships of the words a, b, c, and d, and their "dependency" structures as indicated.

Labels are always affixed to "isa" or other branches as attributes of hyponym nodes. Therefore, the pointers tx in the column of "isa trees" indicate trees in which the corresponding word appears at a lower level of the "ias" branch. Accordingly, it is noted from the table (Table 2) that word a is located in position (0) of the "ias" tree of pointel t0. A search of the contents of the trees in the knowledge base 30 for the parent node reveals, for example, that word b is located in position ( ) of the same tree that contains pointer t0, as shown in FIG. 12. Similarly, it will be seen from the "isa trees" column in Table 2 that other words which have relationships with the word a will be found in the parent nodes of t10(0) and t22(0).

It is found, then, by traversing up the tree by one node from t0(0) that word b is a synonym or hypernym for word a. By similarly reviewing the "isa trees" column of Table 2 for word b, all the words linked to word a by the "ias" labeled branches are found. By traversing up the "ias" tree by one node, the synonym or hypernym of word b is found. As a result, synonym or hypernym chains for word a can be created.

Assume here, for example, that P is a hypernym for Q, and that Q is a hypernym for R. In this case, two "ias" trees are created. In the present invention in order to know the hypernym for R, when R is entered into the table, one of the "ias" trees is used to find the direct hypernym Q for R, and the other "ias" tree is subsequently used to find the direct hypernym P for Q, and thereby to find all the hypernyms for R.

Thus, a synonym relationship between P and R may be converted into two taxonym relationships using their synonym Q, as mentioned above. First this example, the "ias" trees include just two words: the hypernym and the hyponym. In such case, it should be understood that the identification (ID) data for the "ias" trees containing incoming words as hyponyms is important, but that information on the location of the hyponyms in the trees is not indispensable.

In other examples, a single "ias" tree may contain the foregoing P, Q, and R. In that case, it is noted that not only the ID data of an "ias" tree containing a word should be entered into the table as a hyponym, but that information on the location of the hyponym in the tree is also indispensable.

Subsequently, in order to search for a path between two words, it is necessary to check whether any dependency is present between the words, one of which appears in one synonym/hypernym chain and the other of which appeals in another chain. This involves checking to determine whether a set of dependency trees, containing a word located in one of the chains, and a set of dependency trees, containing a word located in the other chain, have a common dependency tree, and whether any dependency or any dependency transition exists between the two words in that tree. In the dependency trees, the node locations of the two words in the trees are used to check whether any dependency between words or any transition between them exists. Here, when a first word modifies a second word indirectly through a third word, a transition of dependency exists between the first and the second words.

For example, referring to Table 2, a check may be conducted for a dependency in which word d modifies word b. It will be seen that the position (0) of b and the position (010) of d in a common node element t110, between a set of dependency structure trees {t30(1), t110(0)} containing b and a set of dependency structure trees {t40(10), t110(010)} containing d, reveals that b is an ancestor of d. In other words, this reveals that a transition of dependency exists between b and d (see FIG. 13).

In the tree structure, when the node of word a is an ancestor of the node of word b, the execute from b to a is determined uniquely. Therefore, discovery of a dependency is deemed to be equivalent to checking a positional relationship. The presence or absence of a path between words can be found by (1) using the "ias" trees to obtain all their synonym/hypernym chains, (2) then obtaining a node element included commonly in sets of dependency structure trees containing the words appearing in the chains, and (3) subsequently inspecting the positional relationship of the words in the trees. The path is obtained by tracing the trees containing the dependency. For example, one path between words a and c is shown in FIG. 14.

Dependency Distance Calculation

Several constraint conditions are possible for paths, and the closeness of dependency between words can be computed according to these conditions. The degree of closeness of dependency is called the "dependency distance". This is calculated according to the number of branches (dependencies) contained in the path and the values obtained as a result of evaluation of the constraints.

Constraint conditions are classifiable into three categories.

(1) The first is "case consistency", i.e., the condition constraint as to whether a semantic case label attached to a branch of a dependency in a path corresponds to a possible relationship in a candidate attachment, i.e., whether a certain word depends on a certain predicate as a subject or an object, and so on. For example, assume that the path shown in FIG. 16 has been obtained for the dependency shown in FIG. 15 of the sentence, "VM/SP keeps the information on the virtual disk." The grammatical case (a case directly obtained from the sentence) between "keep" and "virtual disk" must then be consistent with the semantic case between "store" and "disk." Here, the case consistency between the dependency and the path holds, since the grammatical case "on" can have the semantic case "location" indicative of a location. If this case consistency holds between the dependency and the path, then the value of case consistency of the path is 1; otherwise, it is 0. In this example, the value of case consistency of the path is 1.

(2) The second category of constraint conditions is "co-occurrence consistency", which is a constraint regarding the relationship between words co-occurring in the same sentence. For example, when a certain word depends on a certain predicate as an object, then, for instance, the subject of the predicate should be a specific word or its synonym/hypernym.

Figures 15, 16, 17, 18, 19, 20:
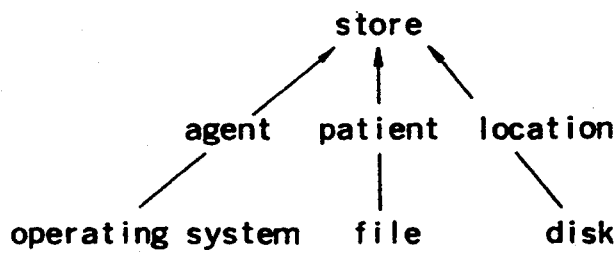
FIG. 15 is an explanatory diagram of the dependency between "keep" and "virtual disk"
FIG. 16 is an explanatory diagram of a path from "virtual disk" to "keep"
FIG. 17 is an explanatory diagram of a co-occurrence relationship.
FIG. 18 is an explanatory diagram of the depedency structure in a knowledge base.
FIG. 19 is an explanatory diagram of a co-occurrence relationship in the knowledge base.
FIG. 20 is an explanatory diagram of the taxonym relationship in the knowledge base.
Figure 21:
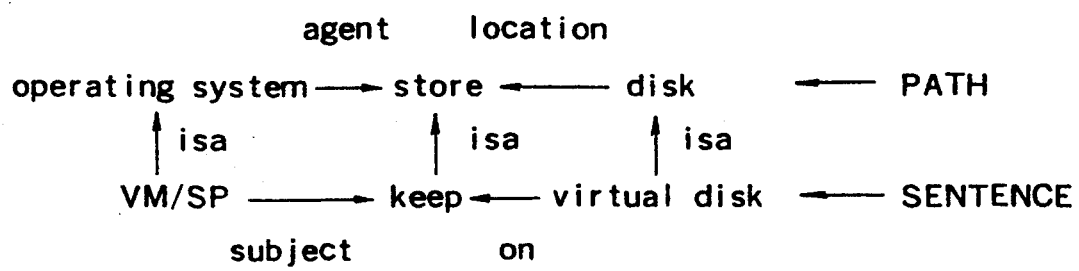
FIG. 21 is an explanatory diagram of the co-occurrence relationship between a path and a sentence.

In the sentence of the foregoing example, "VM/SP" is the subject of "keep", as shown in FIG. 17. In contrast, assuming that the path has been obtained from a dependency structure tree in the knowledge base as shown in FIG. 18, co-occurrence is found as shown in FIG. 19, and it is also found that "operating system" is an agent of "store." Further, if a taxonym relationship between "VM/SP" and "operating system" as shown in FIG. 20 is defined as the knowledge, it is found that the co-occurrence consistency of words holds between the path and the sentence, as shown in FIG. 21. Here, since the grammatical case "subject" can have the semantic case "agent," case consistency also holds. In this fashion, the number of co-occurrence consistencies (concurrent consistencies of words and cases) is the value of the co-occurrence consistency. In this example, the value of the co-occurrence consistency of the path is 1 (it is assumed that co-occurrence consistency for cases other than the subject does not hold).

(3) The third category of constraint conditions is "context consistency". If dependencies between words appearing in a path already exist in previous sentences, the dependencies are considered to be firmly supported by the context, and the dependency distance on the path becomes close.

Figure 22:
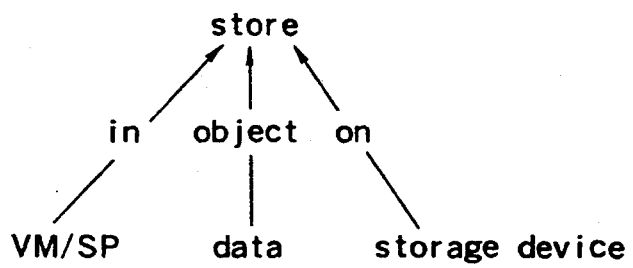
FIG. 22 is an explanatory diagram of a dependency structure of context data.
Figure 23:
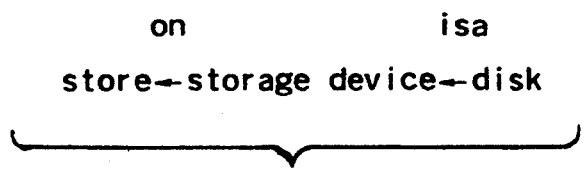
FIG. 23 is an explanatory diagram of a path in the context data.

For example, if the sentence, "In VM/SP, the data is stored in the storage device.", comes before the above sentence, "VM/SP keeps the information on the virtual disk.", then the dependency structure shown in FIG. 22 is stored as the context data (32) of the knowledge base 30 (the "object" referred to therein is not a semantic case but a grammatical case indicative of an object). If a path is sought between "store" and "disk" of the dependency "store←disk" appearing in the path of FIG. 16, using synonym/taxonym relationships and context dependencies of the knowledge base 30, then the path shown in FIG. 23 is found, and it is found that the dependency between "store" and "disk" is defined in the context. Thus the number of dependencies contained in the path and defined in the context is the value of context consistency. In this example, since one dependency is contained in the path and defined in the context, the value of context consistency of the path is 1.

The value of "dependency distance" is calculated by using the values of the foregoing constraints and the number of dependencies contained in the path. More specifically, it is computed from the following formula:

$$\text{dependency distance} = \frac{\text{number of dependencies} - n \times \text{context consistency value}}{(\text{case consistency value} + 1) \times (\text{co-occurrence consistency value} + 1)}$$

This formula assumes that case and co-occurrence consistency affect the entire path, but that context consistency affects each dependency included in the path. Here, n is a real number in the range $0 < n < 1$, and is an heuristic parameter that represents the degree of unimportance of the context. The dependency distance in the above example is 0.125 because the number of dependencies is 1, the value of case consistency is 1, that of co-occurrence consistency is 1, and that of context consistency is 1 (n is defined as 0.5).

Registration in Knowledge Base

The dependency structure that has been determined to be most preferable by the selector 23 is output by the dependency analyzer 20 and registered in the knowledge base 30 where it is used for structural disambiguation of subsequently input data. Since the result of the decision greatly depends on the context, it is preferable to register the result independently as context dependency data in portion 32 in order to distinguish it from learned data in portion 31 (see FIG. 1). More specifically, the knowledge base 30 stores information on the dependency structure and the semantic case, as shown in FIG. 7, in portion 31, and the index table in the right hand column of Table 2 is prepared for context dependency data for each field, in portion 32. When the most preferable dependency has been selected in selector 23 of analyzer 20, corresponding data is added to the knowledge base 30 including the index table in context dependency data portion 32. Duplicate registration may be prevented by referring to a previously registered dependency.

In this fashion, knowledge can be increased automatically in the knowledge base 30. Thus, while in a strict sense the method is not fully automatic since human intervention is needed in some operations, still, knowledge is developed in the system at least semi-automatically.

Practical Examples

1. Syntactic Analysis of Input Sentence and Conversion into Dependency Structure:

Input sentence 1: In VM/SP, the data is stored on the storage device. (This sentence has no structural ambiguity.)

```
Phrase structure ((DECL  (PP    (PREP  "in")
                        (NOUN* "vm/sp" ("vm/sp" SG))
                        (PUNC  ","))
                 (NP     (DET   (ADJ*  "the" ("the" BS)))
                        (NOUN* "data" ("data" SG PL))))
                 (VERB   "is"    ("be" PS))
                 (VERB*  "stored" ("store" ED EN)))
                 (PP     (PREP  "on")
                        (DET   (ADJ*  "the" ("the" BS)))
                        (NOUN* "storage device" ("storage device" SG)))
                 (PUNC   "."))  0)
```

Dependency structure

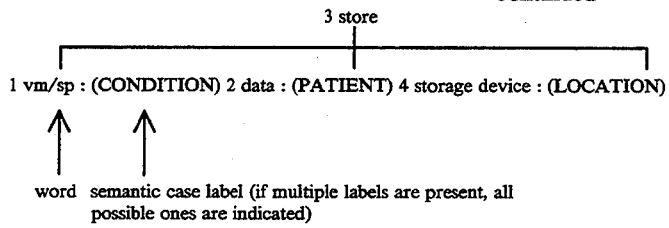

```
           word    semantic case label (if multiple labels are present, all
                   possible ones are indicated)
```

Input sentence 2: VM/SP keeps the information on the virtual disk.
　　　　　　　　(This sentence includes structural ambiguities.)

```
Phrase structure:   ((DECL  (NP    (NOUN*   "vm/sp"   ("vm/sp"       SG)))
        (VERB*    "keeps"   ("keeps"   PS))
        (NP       (DET   (ADJ*   "the"    ("the"      BS)))
                  (NOUN*   "information"   ("information"   SG))
        ?         (PP    (PREP  "on")
                  (DET   (ADJ*   "the"    ("the"      BS)))
                  (NOUN*   "virtual disk"   ("virtual disk"  SG))))
        (PUNC     "."))  0)
```

(a question mark indicates another dependency candidate)

Dependency structure

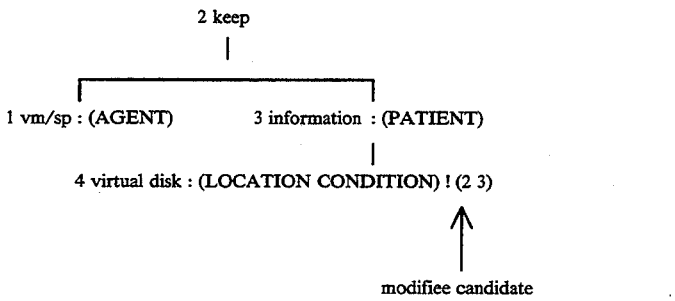

The list of modifiee candidates (2 3) represents that the word ("virtual disk") can be attached to word 2 ("keep") or word 3 ("information").

2. Resolution of structural ambiguity:

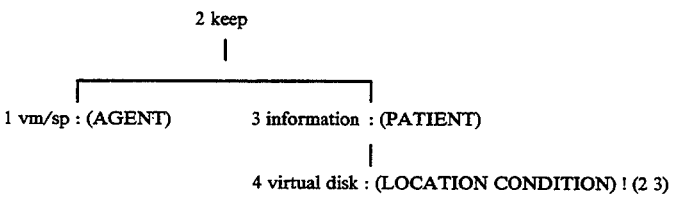

In the dependency tree, two dependency candidates "information"

←— "virtual disk" and "keep" ←— "virtual disk" are found from
the node "virtual disk". A path search is performed, and then
the dependency distance is computed first for the dependency "information" ←— "virtual disk."

Path: ((T421   (tree ID in the knowledge base))
(("information")0)   (("virtual disk"   "disk")00)
This path is shown below:

information

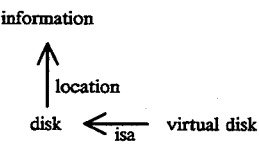

Number of dependencies in the path: 1
Value of case consistency: 1
Value of co-occurrence consistency: 0
Value of context consistency: 0
Dependency distance: 0.5

-continued

Dependency distance of "information" ← "virtual disk" is 0.5.

Subsequently, the same processing is done regarding the dependency "keep" ← "virtual disk."
Path: ((T425) (("keep" "store")) (("virtual disk" "disk")2))
This path is shown in FIG. 16 as:

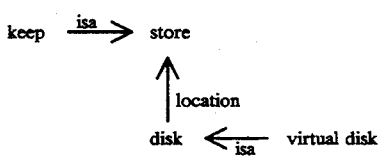

Number of dependencies in the path: 1
Value of case consistency: 1

This path is obtained from the following dependency structure:

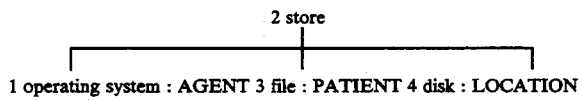

List of co-occurring words in the sentence: ("vm/sp". AGENT) ("information". PATIENT)). List of co-occurring words in the path: (("operating system". AGENT) ("file". PATIENT)). Value of co-occurrence consistency: 1. Context path: (((T426) ("store")) (("disk" "storage device")2)). This context path is shown below (this is obtained from the dependency of the preceding sentence):

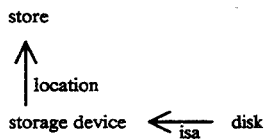

Value of context consistency: 1    Dependency distance: 0.125

Dependency distance of "keep" ← "virtual disk" is 0.125.

In other words, the dependency "keep" ← "virtual disk" is found to be more preferable, and the dependency structure is modified as follows:

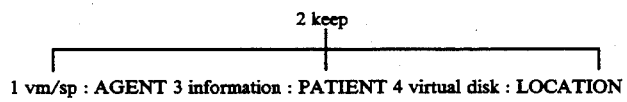

Experiment Results

The ability of the present system to resolve prepositional attachment ambiguities, has been tested by using approximately 2,000 sentences, extracted from a computer manual. The result is shown below. The knowledge used here consists of the dependency structures extracted from about 20,000 definition sentences in the "IBM Dictionary of Computing".

| Total number of prepositional phrases | Number of attachments correctly disambiguated by the system |
|---|---|
| 4290 | 3569 |
| Success ratio | 4290/3569 × 100 = 83.2% |

The results show that the system is significantly effective.

This invention enables a large-scale knowledge database for resolution of structural ambiguities in natural language to be constructed and used efficiently.

TABLE 1

| Examples of semantic case | |
|---|---|
| Semantic case | Role |
| Agent | Person who causes a certain action |
| Patient | Person who experiences a certain event |
| Instrument | Cause of a certain event, or stimulation causing a certain reaction |
| Object | Object to be moved, object to be changed, and contents of consideration or other psychological movement |
| Source | Starting point for movement of an object, initial aspect of a change in a state |
| Target | Terminal point for movement of an object, terminal aspect of a change in a state |
| Location | Location and position of a certain event |
| Time | Time at which a certain event occurs |

TABLE 2

| | Index table | | | | |
|---|---|---|---|---|---|
| Words | isa trees | | | dependency trees | |
| a | t0 (0) | t10 (0) | t22 (0) | t101 (0 1) | t150 (1 0) |
| b | t5 (1) | t52 (0) | t62 (0) | t30 (1) | t110 (0) |

TABLE 2-continued

| Words | isa trees | | | dependency trees | |
|---|---|---|---|---|---|
| c | t2 (0) | t15 (0) | t72 (1) | t101 (1 1) | t350 (0 2 3) |
| d | t8 (1) | t25 (1) | t82 (0) | t40 (1 0) | t110 (0 1 0) |
| ... | ... | | | ... | |

What is claimed is:

1. A programmed computer system for natural language analysis, comprising:
   (a) knowledge base means for storing information representing dependencies among words in sentences and information representing taxonym relationships of words, said dependencies information being in the form of first-type tree structures and said taxonym information being in the form of second-type tree structures;
   (b) table means, in said knowledge base means and responsive to the entry of a word thereto, for outputting information indicative of 1) a first-type tree structure in which said word appears, 2) node location information of said word in said first-type tree structure, and 3) information indicative of a second-type tree structure in which said word is contained as a hyponym;
   (c) means for judging structural unambiguity of a sentence input to the system;
   (d) means for extracting a modifier and modifiee pair of words for each possible dependency in a sentence judged to be structurally ambiguous by said judging means;
   (e) means for entering said modifier-modifiee pair of words into said table means and determining, on the basis of the information output by said table means, a path for each said modifier-modifiee pair of words with the path having a different word of said modifier-modifiee pair of words at opposite ends and including at least some words in the first-type tree structure;
   (f) means for calculating the path distance for each said modifier-modifiee pair of words; and
   (g) means for determining the most preferable dependency on the basis of said path distance calculated for each said modifier-modifee pair of words.

2. A system for natural language analysis according to claim 1, further comprising:
   (h) means for storing in said knowledge base means a first-type tree structure for an input sentence including said most preferable dependency determined by said determining means, and for renewing said table means in response thereto.

3. A system for natural language analysis according to claim 2 wherein said knowledge base means separately stores learned data and context data added by said storing means.

4. A system for natural language analysis according to claim 2 wherein said calculating means calculates said path distance on the basis of the degree of consistency between the path and a first-type tree structure added by said storing means.

5. A system for natural language analysis according to claim 1 wherein said table means is separately prepared for learned data and for context data.

6. A system for natural language analysis according to claim 1 wherein said calculating means calculates said path distance, based on the number of dependencies included in the path.

7. A system for natural language analysis according to claim 1 wherein said first-type tree structure is provided with semantic case data for each dependency.

8. A system for natural language analysis according to claim 7 wherein said calculating means calculates said path distance according to the consistency between the case relationship between a modifier and a candidate modifiee and the case relationship for the path.

9. A system for natural language analysis according to claim 8 wherein said calculating means calculates a dependency distance using the formula:

$$\text{dependency distance} = \frac{\text{number of dependencies} - n}{(\text{case consistency value} + 1)} \times \frac{\text{context consistency value}}{(\text{co-occurrence consistency value} + 1)}$$

where n is a real number in the range $0 < n < 1$ and is an heuristic parameter that represents the degree of unimportance of the context, and the other parameters have values of 1 or 0.

10. A system for natural language analysis according to claim 1 wherein said calculating means calculates said path distance, on the basis of the consistency of co-occurrence of a word included in an input sentence and a word included in said first-type tree structure for the path.

11. A system for natural language analysis according to claim 1 wherein said second-type tree structure is an isa tree having only two nodes corresponding to a hypernym and a hyponym, and wherein said entering means is responsive to an output of a hypernym of a word forming the pair, to iterate search for an isa tree including said hypernym as a hyponym.

12. A system for natural language analysis according to claim 1 wherein a synonym relationship is represented by two isa trees.

13. In a computer system including a knowledge base that stores first-type tree structures representing dependencies among words in sentences and second-type tree structures representing taxonym relationships of words and including a table responsive to the entry of a word for 1) outputting identification data of said first-type tree structure in which said word appears, 2) node location data of said word in said first-type tree structure, and 3) identification data of said second-type tree structure in which said word appears as a hyponym, a computer implemented natural language analysis method comprising the steps of:
   (a) judging the structural unambiguity of an incoming sentence;
   (b) extracting a modifier and modifiee pair of two words for each possible dependency in a sentence judged to be structurally ambiguous;
   (c) entering the two words of each said modifier-modifiee pair into said table means and for each said modifier-modifiee pair determining, on the basis of the output data, a path that has said two words of said modifier-modifiee pair at opposite ends and contains some of the words appearing in said first-type tree structure;
   (d) calculating the path distance for each pair; and
   (e) determining the most preferable dependency relationship, the basis of said path distance calculated for each said pair.

14. A natural language analysis method according to claim 13 further comprising the step of:

(f) storing in said knowledge base a first-type tree structure for an input sentence including said most preferable dependency determined by said step (e) and renewing said table in response thereto.

15. A natural language analysis method according to claim 14 wherein said knowledge base separately stores learned data and context data added by said step (f).

16. A natural language analysis method according to claim 14 wherein said table is separately prepared for learned data and context data.

17. A natural language analysis method according to claim 13 wherein said step (d) calculates said distance, on the basis of the number of dependencies included in the path.

18. A natural language analysis method according to claim 13 wherein said first-type tree structure is provided with semantic case data for each dependency.

19. A natural language analysis method according to claim 18 wherein said step (d) calculates said distance according to the consistency between the case relationship of a modifier and a candidate modifiee and the case relationship for the path.

20. A natural language analysis method according to claim 13 wherein said step (d) calculates said distance according to the co-occurrence consistency of a word included in said input sentence and a word included in said first-type tree structure for the path.

21. A natural language analysis method according to claim 13 wherein said step (d) calculates said distance according to the degree of consistency between the path and a first-type tree structure added by said step (f).

22. A natural language analysis method according to claim 13 wherein said second-type tree structure is an isa tree having only two nodes corresponding to a hypernym and a hyponym, and wherein said step (c) is responsive to an output of a hypernym of a word forming the pair, to iterate search for an isa tree including said hypernym as a hyponym.

23. A natural language analysis method according to claim 13 wherein a synonym relationship is represented by two isa tree structures, 24. A method for constructing a knowledge base in a computer for natural language analysis comprising the computer implemented steps of:
   (a) preparing a knowledge base that stores tree structures representing dependencies among words in sentences;
   (b) determining the most preferable of the possible dependencies for an incoming sentence by using data in said knowledge base; and
   (c) storing in said knowledge base a tree structure for the incoming sentence that includes said most preferable dependency.

25. A method for constructing a knowledge base according to claim 24 wherein said knowledge base separately stores learned data and context data added by said step (c).

26. A method of constructing a knowledge base in a computer for natural language analysis comprising the computer implemented steps of:
   (a) preparing a database for storing tree structures representing dependencies among words in sentences, and preparing a table responsive to the entry of a word for outputting identification data of at least one of said tree structures containing said word and node location data of said word in said tree structure;
   (b) determining the most preferable of the possible dependencies for an ambiguous sentence by using data in said database and said table; and
   (c) storing in said database a tree structure for the ambiguous sentence that includes said most preferable dependency and renewing said table in response thereto.

27. A method for constructing a knowledge base according to claim 26 wherein said knowledge base separately stores learned data and context data added by said step (c).

28. A method for constructing a knowledge base according to claim 26 wherein said table is separately prepared for learned data and for context data.

29. A programmed computer system for natural language analysis, comprising:
   means for receiving respective syntactic structures including attachments indicative of ambiguities, derived from natural language sentences to be analyzed, and for converting said syntactic structures into dependency structures indicative of the dependency between words in said sentences;
   knowledge base means for storing information representing dependencies between words in sentences and information representing taxonym relationships of words, said information being in the form of tree structures;
   means for extracting dependencies from each dependency structure and producing respective multiple possible candidate dependencies;
   means for searching said knowledge base means for stored information representing dependencies related to said candidate dependencies and for selecting the most preferable candidate dependency for each dependency structure based on a comparison of dependency distances derived from a path search in said tree structures of said knowledge base means; and
   means for transforming each dependency structure using such dependency structures most preferable candidate dependency to remove the ambiguities therein.

30. A system for natural language analysis as in claim 29 wherein said knowledge base comprises table means responsive to the entry of a word for outputting identification data of at least one of said tree structures containing said word and node location data of said word in said tree structure.

31. A system for natural language analysis as in claim 29 wherein said dependency distances are determined using the formula:

$$\text{dependency distance} = \frac{\text{number of dependencies} - n \times \text{context consistency value}}{(\text{case consistency value} + 1) \times (\text{co-occurrence consistency value} + 1)}$$

where n is a real number in the range $0 < n < 1$ and is an heuristic parameter that represents the degree of unimportance of the context, and the other parameters have values of 1 or 0.

* * * * *